(12) United States Patent
Kim

(10) Patent No.: US 9,900,415 B2
(45) Date of Patent: Feb. 20, 2018

(54) CONTENT SHARING METHOD AND MOBILE TERMINAL USING THE METHOD

(71) Applicant: Samsung Electronics Co. Ltd., Suwon-si, Gyeonggi-do (KR)

(72) Inventor: Jae-hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 13/661,587

(22) Filed: Oct. 26, 2012

(65) Prior Publication Data

US 2013/0262578 A1 Oct. 3, 2013

(30) Foreign Application Priority Data

Apr. 2, 2012 (KR) .................. 10-2012-0034094

(51) Int. Cl.

| | |
|---|---|
| G06F 15/16 | (2006.01) |
| H04M 1/2745 | (2006.01) |
| H04M 1/725 | (2006.01) |
| H04W 4/20 | (2018.01) |
| H04W 4/08 | (2009.01) |
| H04L 12/58 | (2006.01) |
| G06Q 50/00 | (2012.01) |

(52) U.S. Cl.
CPC .......... *H04M 1/2745* (2013.01); *H04L 51/32* (2013.01); *H04M 1/72522* (2013.01); *H04W 4/08* (2013.01); *H04W 4/206* (2013.01); *G06Q 50/01* (2013.01); *H04M 1/7253* (2013.01)

(58) Field of Classification Search
CPC ....................................................... H04L 51/32
See application file for complete search history.

(56) References Cited

U.S. PATENT DOCUMENTS

| | | | |
|---|---|---|---|
| 7,620,902 B2 | 11/2009 | Manion et al. | |
| 8,078,397 B1 | 12/2011 | Zilka | |
| 8,156,442 B2 * | 4/2012 | Aoki et al. .................... | 715/753 |
| 8,244,851 B1 * | 8/2012 | Postoaca ................ | G06Q 50/01 |
| | | | 709/205 |
| 8,526,587 B2 * | 9/2013 | Uhler et al. ............. | 379/202.01 |
| 8,527,486 B2 * | 9/2013 | Wittig et al. ................. | 707/706 |
| 2003/0236823 A1 | 12/2003 | Patzer et al. | |
| 2006/0242234 A1 | 10/2006 | Counts et al. | |
| 2008/0022304 A1 | 1/2008 | Prus et al. | |
| 2008/0027909 A1 * | 1/2008 | Gang et al. ....................... | 707/3 |

(Continued)

FOREIGN PATENT DOCUMENTS

| | | |
|---|---|---|
| CN | 101167066 A | 4/2008 |
| CN | 101645926 A | 2/2010 |

(Continued)

*Primary Examiner* — Karen Tang
(74) *Attorney, Agent, or Firm* — Jefferson IP Law, LLP

(57) ABSTRACT

A method of sharing content performed by a mobile terminal is provided. The method includes providing a list of social groups that share group activity information of a group member by executing a phone book, receiving a selection of at least one social group from the list of social groups, transmitting at least one piece of content selected by a first user of the mobile terminal to a device of a group member included in the selected at least one social group, and adding the transmitted at least one piece of content to a group share space corresponding to the selected at least one social group.

20 Claims, 18 Drawing Sheets

(a)

(b)

(c)

(d)

(56) References Cited

U.S. PATENT DOCUMENTS

| | | | |
|---|---|---|---|
| 2008/0147810 A1* | 6/2008 | Kumar | H04L 67/38 709/206 |
| 2008/0208963 A1* | 8/2008 | Eyal et al. | 709/203 |
| 2008/0307311 A1* | 12/2008 | Eyal | 715/733 |
| 2009/0157693 A1* | 6/2009 | Palahnuk | G06Q 30/00 |
| 2009/0234876 A1* | 9/2009 | Schigel et al. | 707/102 |
| 2009/0327885 A1 | 12/2009 | Aoki et al. | |
| 2010/0014088 A1 | 1/2010 | Wiki | |
| 2010/0251177 A1 | 9/2010 | Geppert et al. | |
| 2010/0281113 A1* | 11/2010 | Laine | G06Q 10/10 709/204 |
| 2010/0306185 A1* | 12/2010 | Smith | G06Q 10/107 707/709 |
| 2010/0318544 A1* | 12/2010 | Nicolov | G06F 17/30035 707/759 |
| 2011/0055335 A1 | 3/2011 | Reilly et al. | |
| 2011/0151890 A1 | 6/2011 | Platt et al. | |
| 2011/0213785 A1* | 9/2011 | Kristiansson | G06Q 10/10 707/748 |
| 2012/0054673 A1* | 3/2012 | Kim | G06F 3/0482 715/784 |
| 2012/0054691 A1* | 3/2012 | Nurmi | 715/854 |
| 2012/0151398 A1* | 6/2012 | Foy et al. | 715/769 |
| 2012/0165049 A1* | 6/2012 | Arnold | H04M 1/72552 455/466 |
| 2012/0166261 A1* | 6/2012 | Velusamy et al. | 705/14.16 |
| 2012/0197984 A1* | 8/2012 | Rao | G06Q 10/107 709/203 |
| 2012/0198013 A1* | 8/2012 | Quillen | H04L 67/36 709/206 |
| 2012/0252418 A1* | 10/2012 | Kandekar et al. | 455/414.1 |
| 2012/0262276 A1* | 10/2012 | Ross | H04L 67/18 340/8.1 |
| 2012/0272287 A1* | 10/2012 | Kuhlke et al. | 726/1 |
| 2013/0055099 A1* | 2/2013 | Yao | G06Q 10/101 715/739 |
| 2013/0055154 A1* | 2/2013 | Sabur | 715/810 |
| 2013/0073400 A1* | 3/2013 | Heath | 705/14.73 |
| 2013/0073473 A1* | 3/2013 | Heath | 705/319 |
| 2013/0080538 A1* | 3/2013 | McEachern | G06Q 50/01 709/206 |
| 2013/0097246 A1* | 4/2013 | Zifroni et al. | 709/204 |
| 2013/0110927 A1* | 5/2013 | Marra | G06Q 50/01 709/204 |
| 2013/0117692 A1* | 5/2013 | Padmanabhan et al. | 715/753 |
| 2013/0157624 A1* | 6/2013 | Talwar | H04W 4/14 455/412.1 |
| 2013/0191762 A1* | 7/2013 | Rajagopalan | H04L 12/1818 715/753 |
| 2013/0217365 A1* | 8/2013 | Ramnani | 455/414.1 |
| 2013/0227431 A1* | 8/2013 | Vasudevan | H04L 65/403 715/753 |
| 2013/0318347 A1* | 11/2013 | Moffat | H04L 63/08 713/168 |
| 2014/0129942 A1* | 5/2014 | Rathod | 715/720 |
| 2016/0088139 A1* | 3/2016 | Vance | G06Q 10/107 715/763 |
| 2016/0105448 A1* | 4/2016 | Szabo | G06F 21/10 726/27 |

FOREIGN PATENT DOCUMENTS

| | | |
|---|---|---|
| CN | 102077554 A | 5/2011 |
| CN | 102347916 A | 2/2012 |
| EP | 2 166 788 A1 | 3/2010 |
| JP | 2006-505991 A | 2/2006 |
| KR | 10-2004-0060636 A | 7/2004 |
| KR | 10-2005-0104146 A | 11/2005 |
| KR | 10-2006-0007623 A | 1/2006 |
| KR | 10-2006-0038656 A | 5/2006 |
| KR | 10-2009-0077166 A | 7/2009 |
| KR | 10-2011-0037247 A | 4/2011 |
| KR | 10-2011-0103515 A | 9/2011 |
| WO | 2004/043070 A | 5/2004 |
| WO | 2008/089479 A1 | 7/2008 |

* cited by examiner

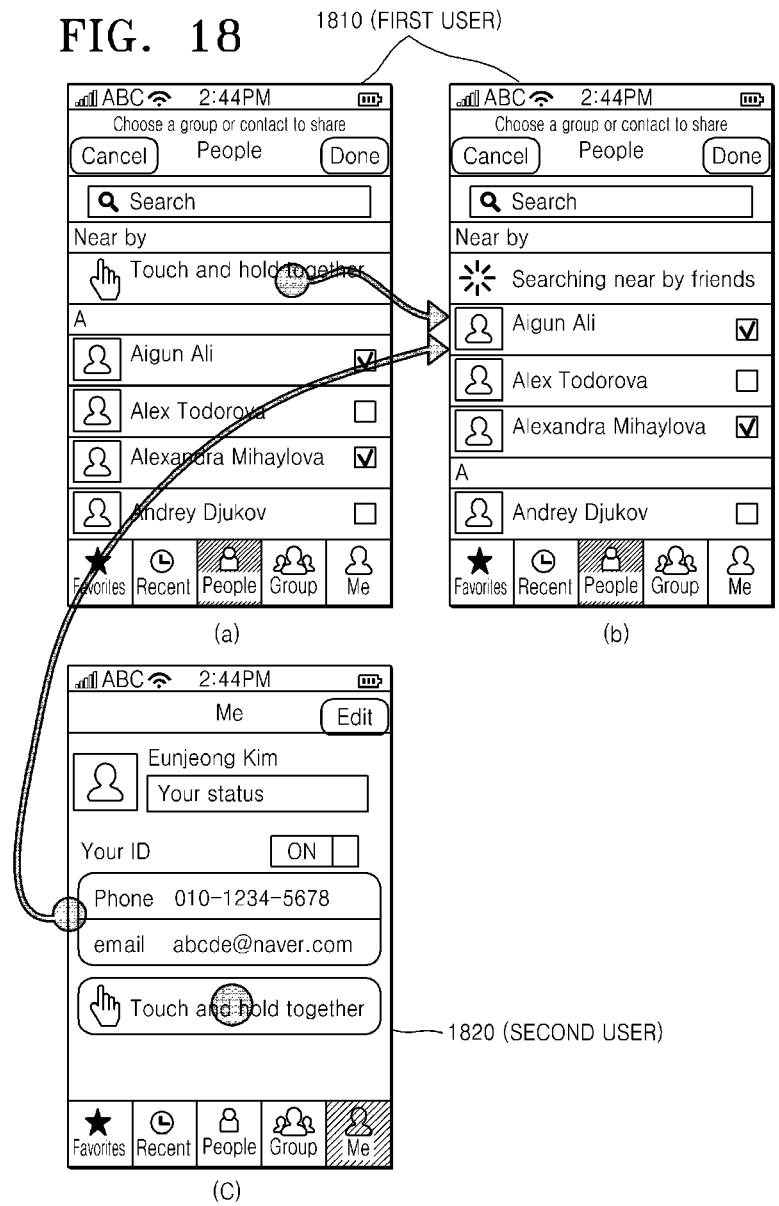

CONTENT SHARING METHOD AND MOBILE TERMINAL USING THE METHOD

PRIORITY

This application claims the benefit under 35 U.S.C. § 119(a) of a Korean patent application filed on Apr. 2, 2012 in the Korean Intellectual Property Office and assigned Serial No. 10-2012-0034094, the entire disclosure of which is hereby incorporated by reference.

BACKGROUND OF THE INVENTION

1. Field of the Invention:

The present invention relates to a method and apparatus for sharing content. More particularly, the present invention relates to a content sharing method to share group activity information between group members through a phone book, and a mobile terminal based on the method.

2. Description of the Related Art:

Mobile devices, such as smart phones, are equipped with a variety of functions that enable users to perform tasks more easily, and to communicate with one another more easily, thereby allowing users to experience increased levels of enjoyment. As the number of smart phone users increases, the number of Social Networking Service (SNS) users also increases. An SNS denotes an online service that focuses on building social relationships among people. SNS users may build new social links or reinforce their current relationships.

However, users who do not use smart phones or are not familiar with smart phones have great difficulties in familiarizing themselves with SNSs. In addition, those users may be easily cut off from their friends who do not use any SNS. Meanwhile, private information may inadvertently become public through an SNS, which makes users feel anxious.

Therefore, a system for easily and conveniently forming an SNS group that includes people with whom a relationship is desired by users is needed. Also needed is an apparatus and system with increased security.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a content sharing method to share group activity information between group members through a phone book, and a mobile terminal based on the method.

In accordance with an aspect of the present invention, a method of sharing content performed by a mobile terminal is provided. The method includes providing a list of social groups that share group activity information of a group member by executing a phone book, receiving a selection of at least one social group from the list of social groups, transmitting at least one piece of content selected by a first user of the mobile terminal to a device of a group member included in the selected at least one social group, and adding the transmitted at least one piece of content to a group share space corresponding to the selected at least one social group.

In accordance with another aspect of the present invention, the providing a list of social groups may further include displaying a list of second users registered in the phone book, receiving from the first user a selection of at least one second user from the list of second users, and providing a list of social groups that the selected at least one second user joins.

In accordance with another aspect of the present invention, the receiving of the selection of the at least one social group may further include receiving selections of a plurality of social groups, wherein the transmitting of the at least one piece of content include transmitting the at least one piece of content selected by the first user of the mobile terminal to devices of group members included in each of the plurality of social groups, and wherein the adding of the transmitted at least one piece of content includes adding the transmitted at least one piece of content to a group share space corresponding to each of the plurality of social groups.

In accordance with another aspect of the present invention, the providing a list of social groups may further include receiving a share request to share the at least one piece of content with the group member from the first user, and providing the list of social groups by executing the phone book in response to the share request.

In accordance with another aspect of the present invention, the at least one piece of content may further include at least one piece of information regarding a predefined application or link information of a web browser.

In accordance with another aspect of the present invention, the group activity information may further include at least one piece of information selected from among message information, photo information, bookmark information, music information, video information, and document information of the group member.

In accordance with another aspect of the present invention, the method may further include providing an external Social Networking Service (SNS) group list by executing a phone book, receiving a selection of at least one external SNS group from the external SNS group list from the first user, transmitting the at least one piece of content to a device of a group member included in the selected at least one external SNS group or to an external SNS server corresponding to the selected at least one external SNS group, and adding the at least one piece of content to a group share space corresponding to the selected at least one external SNS group.

In accordance with another aspect of the present invention, the method may further include providing an instant group list by executing a phone book, receiving from the first user a selection of at least one instant group from the instant group, and transmitting the at least one piece of content to a device of a group member included in the selected at least one instant group.

In accordance with another aspect of the present invention, the providing of the instant group list may further include transmitting messages to devices of a plurality of third users selected by the first user, receiving a request to create an instant group from the first user with respect to the plurality of third users to which the messages are transmitted, and creating an instant group including the plurality of third users and adding the created instant group to the phone book in response to the instant group creation request.

In accordance with another aspect of the present invention, the method may further include receiving an external device search request from the first user, searching for devices of second users registered in the phone book that are located within a predefined distance from the mobile terminal, in response to the external device search request, providing a list of second users corresponding to the found devices, receiving from the first user a selection of at least one second user from the list of second users, and transmitting the at least one piece of content to a device of the selected at least one second user.

According to another aspect of the present invention, a mobile terminal is provided. The mobile terminal includes a display unit for providing a list of social groups that share group activity information of a group member by executing a phone book, a user input unit for receiving a selection of at least one social group from the list of social groups, a communication unit for transmitting at least one piece of content selected by a first user of the mobile terminal to a device of a group member included in the selected at least one social group, and a control unit for adding the transmitted at least one piece of content to a group share space corresponding to the selected at least one social group, and for controlling the display unit, the user input unit, and the communication unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 18A through 18C are screen images for searching for and providing devices of second users located within a predefined distance from a mobile terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
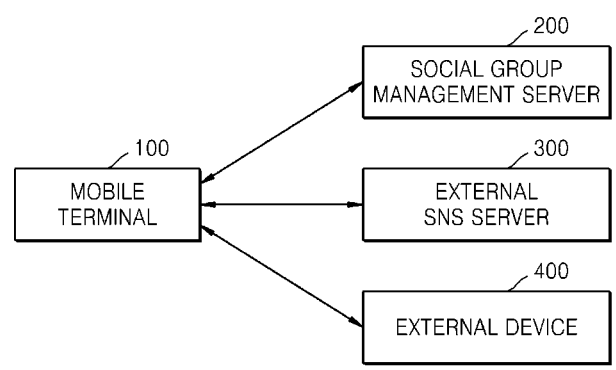
FIG. 1 is a block diagram illustrating a system of providing a Social Networking Service (SNS) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the forms "a," "an," and "the" include plural referents unless the context clearly dictates otherwise. Thus, for example, reference to "a component surface" includes reference to one or more of such surfaces.

The terms used in the present disclosure will be briefly described below before exemplary embodiments of the present invention are described in greater detail.

Most of the terms used herein are terms that have been widely used in the technical art to which the present invention pertains. Some of the terms used herein may reflect the intentions of technicians in this art, precedents, or new technologies. In addition, some of the terms used herein may be arbitrarily chosen by the present applicant. In this case, these terms are defined in detail below. Accordingly, the specific terms used herein should be understood based on the unique meanings thereof and the whole context of the present invention.

In the present disclosure, it should be understood that the terms, such as 'include' or 'have,' etc., are intended to indicate the existence of the features, numbers, steps, actions, components, parts, or combinations thereof disclosed in the disclosure, and are not intended to preclude the possibility that one or more other features, numbers, steps, actions, components, parts, or combinations thereof may exist or may be added. In addition, the terms, such as 'unit' or 'module', or the like, should be understood as a unit that processes at least one function or operation and that may be embodied in a hardware manner, a software manner, or a combination of the hardware manner and the software manner.

Throughout the present disclosure, the term 'phone book' denotes a program that manages contact information of a user's acquaintances. The phone book may be provided in widget form. The phone book may include information such as acquaintances' phone numbers, addresses, emails, offices, birthdays, pictures, and the like.

Throughout the present disclosure, the term 'object' denotes anything that a user can select. Examples of an object may include an icon, a link, a picture, a text, an index item, and so on. The term 'page' denotes a space containing content, information, or an object. For example, a page may be a web page, a list of contents, a list of thumbnails, a tray of photographs, a tray of icons, and so on.

Hereinafter, exemplary embodiments of the present invention will be described in greater detail with reference to the accompanying drawings so that those of ordinary skill in the art can easily accomplish the present invention. This invention may, however, be embodied in many different forms and should not be construed as being limited to the embodiments set forth herein. In the following description, well-known functions or constructions are not described in detail if it is determined that they would obscure the invention due to unnecessary detail. Throughout the drawings, whenever the same element reappears in a subsequent drawing, it is denoted by the same reference numeral.

Expressions such as "at least one of," when preceding a list of elements, modify the entire list of elements and do not modify the individual elements of the list.

FIG. 1 is a block diagram of a system providing a Social Networking Service (SNS) according to an exemplary embodiment of the present invention.

Referring to FIG. 1, the system providing an SNS may include a mobile terminal 100, a social group management server 200, an external SNS server 300, and an external device 400.

The mobile terminal 100 denotes a terminal that may provide a first user with an SNS through a phone book. The mobile terminal 100 according to an exemplary embodiment of the present invention may be embodied in any of various forms. Examples of the mobile terminal 100 may include a mobile phone, a smartphone, a notebook computer, a tablet Personal Computer (PC), an electronic book terminal, a digital broadcasting terminal, a Personal Digital Assistant (PDA), a Portable Multimedia Player (PMP), a navigation device, and the like.

The mobile terminal 100 may communicate data with the social group management server 200, the external SNS server 300, and the external device 400. The construction of the mobile terminal 100 will be described in detail further below with reference to FIG. 2.

The social group management server 200 is a server that manages a social group created by the mobile terminal 100. The social group according to an exemplary embodiment of the present invention denotes a group that shares group activity information under mutual recognition of group members.

The social group according to an exemplary embodiment of the present invention may consist of a user of the mobile terminal 100 and acquaintances registered in a phone book selected by the user. For convenience of description, the user of the mobile terminal 100 is referred to as a first user, and the acquaintances registered in the phone book thereof are referred to as a second user.

The social group management server 200 according to an exemplary embodiment of the present invention may receive a social group join request message including identification information of the second user from the mobile terminal 100. The social group management server 200 may transmit the social group join request message to a device of the second user. The social group management server 200 may receive a social group join acceptance message from the device of the second user and transmit the social group join acceptance message to the mobile terminal 100. For example, the social group management server 200 may mediate between the mobile terminal 100 and the external device 400 so that the external device 400 may join the social group.

The social group management server 200 according to an exemplary embodiment of the present invention may obtain the group activity information of the social group from the mobile terminal 100. The social group management server 200 may provide the group activity information of the social group through a web site.

In a case in which a request to create a social group is received from the mobile terminal 100, the social group management server 200 may generate link information corresponding to the social group. The link information denotes, for example, information regarding an access route by which the mobile terminal 100 may access a specific web site. An example of the link information may include a Uniform/Universal Resource Locator (URL).

The link information corresponding to the social group according to an exemplary embodiment of the present invention may be useful to a social group member who owns a device that does not support an SNS because it may enable the social group member who owns the device that does not support the SNS to participate in group activities based on the link information.

In a case in which the device of the group member is accessed based on the link information, the social group management server 200 according to an exemplary embodiment of the present invention may authenticate an access authority of the group member.

In a case in which the first user inputs private information, the social group management server 200 may automatically generate a web page corresponding to the private information of the first user. The social group management server 200 may transmit link information regarding the web page corresponding to the private information of the first user to the mobile terminal 100.

The social group management server 200 may obtain location information from the device of the second user registered in the phone book of the mobile terminal 100. Thus, in a case in which a request for a second user list present within a predefined distance from the mobile terminal 100 is received, the social group management server 200 may extract the list of second user(s) that own(s) a device(s)

present within the predefined distance from the mobile terminal 100 and transmit the extracted second user list to the mobile terminal 100.

The external SNS server 300 denotes a server that may provide the SNS from outside the mobile terminal 100. Examples of an external SNS server 300 may include a Facebook server, a Twitter server, and the like.

The external SNS server 300 may obtain group activity information corresponding to an external SNS group from the mobile terminal 100. The external SNS server 300 may post the obtained group activity information on a web site.

The external device 400 denotes the device of the second user registered in the phone book of the mobile terminal 100. The external device 400 according to an exemplary embodiment of the present invention may be a device of a social group member.

The external device 400 may obtain group activity information of a social group member. For example, the external device 400 may obtain the group activity information of a social group member from the mobile terminal 100. The external device 400 may transmit group activity information of the second user to the mobile terminal 100.

The external device 400 according to an exemplary embodiment of the present invention may be embodied in any of various forms. Examples of the external device 400 may include any of a desktop PC, a mobile phone, a smartphone, a notebook computer, a tablet PC, an electronic book terminal, a smart TeleVision (TV), a digital broadcasting terminal, a PDA, a PMP, a navigation device, and the like.

Figure 2:
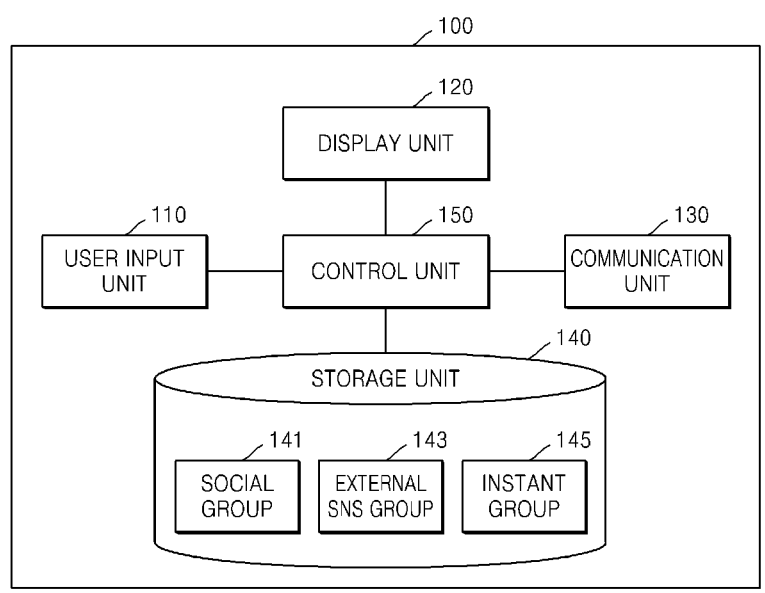
FIG. 2 is a block diagram illustrating a mobile terminal according to an exemplary embodiment of the present invention.

FIG. 2 is a block diagram illustrating the mobile terminal according to an exemplary embodiment of the present invention.

Referring to FIG. 2, the mobile terminal 100 according to an exemplary embodiment of the present invention may include a user input unit 110, a display unit 120, a communication unit 130, a storage unit 140, and a control unit 150. However, the elements shown in FIG. 2 are not indispensable to the mobile terminal 100. The mobile terminal 100 may include more or less elements than those shown in FIG. 2.

The foregoing elements of the mobile terminal 100 will now be described.

The user input unit 110 generates input data for controlling an operation of the mobile terminal 100. The user input unit 110 may include a keypad, a dome switch, a touch pad, e.g., a constant pressure type/capacitive type touchpad, a jog wheel, a jog switch, HardWare (H/W) buttons, and so on. If the touch pad forms a layered structure together with the display unit 150, then the touch pad may be referred to as a touch screen.

The user input unit 110 according to an exemplary embodiment of the present invention may include any of various sensors to detect a touch on or near a touch screen, i.e., a real-touch or a proximity-touch. A tactile sensor is a type of sensor that may, for example, sense a touch on or near a touch screen. The tactile sensor may detect a touch on a screen to a same degree or more precisely than the degree to which a human can detect the touch. The tactile sensor may be capable of sensing various pieces of information, e.g., the toughness of a contact surface, the hardness of an object that is touched, and the temperature of a point that is touched.

A proximity sensor is another example of a sensor that may sense a touch near a touch screen.

A proximity sensor is a sensor that may, for example, sense the presence of an object that is approaching or that is located near a predefined detection surface, without any physical contact, and by using an electromagnetic field or infrared rays. Thus, the proximity sensor may have a very long lifetime, and may be used for various purposes.

Examples of a suitable proximity sensor may include a transmission photoelectric sensor, a direct reflective photoelectric sensor, a mirror reflective photoelectric sensor, a high-frequency oscillation proximity sensor, an electrostatic capacitive proximity sensor, a magnetic proximity sensor, an infrared proximity sensor, and so on.

The user input unit 110 according to an exemplary embodiment of the present invention may detect a gesture or a pattern input by a user. For example, the user input unit 110 may detect a user's gesture, e.g., a dragging, a flicking, a tapping, a touching and holding, a double-tapping, a panning, or a sweeping. In such a case, the user input unit 110 may sense, for example, a direction, a speed, and/or a movement length of a gesture.

The user input unit 110 according to an exemplary embodiment of the present invention may receive at least one of a group tab of the phone book, a recent call tab thereof, a favorites tab thereof, and a private information tab thereof from the first user of the mobile terminal 100.

The user input unit 110 according to an exemplary embodiment of the present invention may receive a request to create a social group including a second user registered in the phone book, a search request of the external device 400, a request to create an instant group with respect to a plurality of third users, and a content share request from the first user.

The user input unit 110 according to an exemplary embodiment of the present invention may receive a selection from among the social group, a second user's selection, a selection of an external SNS group, and a first user's selection of the instant group.

The display unit 120 displays information processed by the mobile terminal 100. For example, the display unit 120 may display a phone book including at least one of the group tab, the recent call tab, the favorite site tab, and the private information tab. The display unit 120 may provide a list of social groups, a list of second user(s) added to favorite sites by the first user, a list of second user(s) that communicate(s) with the first user more than a predefined number of times for a predefined period of time, a list of second user(s) that communicate(s) with the first user within the predefined period of time, a list of second user(s) that own(s) a device present within a predefined distance from the mobile terminal 100, and an external SNS group list.

The display unit 120 may display at least one of group information corresponding to the social group or the external SNS group, a group share space including group activity information, and link information. The group activity information according to an exemplary embodiment of the present invention denotes information regarding content shared with group members of a predefined group. The content shared with group members may include a captured image, music, application information, web browser link information, video, a message, and the like.

The display unit 120 may display private information of the first user and provide a setting object that facilitates the first user to set a range for revealing the private information of the first user for each piece of private information.

As described above, in a case in which the display unit 120 and the touch pad form a layered structure together to manufacture a touch screen as described above, the display unit 120 may be used as not only an output device but also an input device. The display unit 120 may include at least one from among a Liquid Crystal Display (LCD), a Thin Film Transistor-Liquid Crystal Display (TFT-LCD), an Organic Light-Emitting Diode (OLED), a flexible display, and a 3-Dimensional (3D) display. In addition, at least two display units 120 may be used according to a structure of the mobile terminal 100. The touch screen may be constructed to detect a location of a touch input, a touched area, and a touch pressure. In addition, the touch screen may be constructed to detect not only a real-touch but also a proximity touch.

In the present disclosure, the term 'real-touch' denotes a case in which a pointer actually touches a screen, and the term 'proximity-touch' denotes a case in which a pointer does not actually touch a screen but approaches the screen within a predefined distance from the screen. In the present disclosure, the term 'pointer' denotes a tool for touching a particular location on or near a screen. Examples of the pointer include a stylus pen and a finger of a user.

The communication unit 130 may include one or more elements for communicating the mobile terminal 100 with servers 200 and 300 or the external device 400.

For example, the communication unit 130 may include a broadcast receiving module, a mobile telecommunication module, a wireless internet module, a wired internet module, a short-range wireless communication module, a location information module, and so on.

The broadcast receiving module receives a broadcast signal and/or information related to broadcasting from an external broadcasting management server (not shown) via a broadcast channel. The broadcast channel may be any of a satellite channel, a terrestrial broadcast channel, or the like.

The mobile telecommunication module exchanges a radio signal with at least one from among a base station, an external terminal, and a server via a mobile telecommunication network. Examples of the radio signal may include a voice call signal, a video communication call signal, and various types of data needed to exchange a text message/multimedia message.

The wireless internet module is a module for accessing the Internet in a wireless manner. The wireless internet module may be installed inside or outside the communication unit 130.

The short-range wireless communication module is a module for establishing short-range wireless communication. Examples of short-range wireless communication technology may include Bluetooth, Radio Frequency Identification (RFID), Infrared Data Association (IrDA), Ultra WideBand (UWB), ZigBee, Wi-Fi Direct (WFD), and Near Field Communication (NFC).

The location information module is a module for detecting the location of the mobile terminal 100 or obtaining location information of the mobile terminal 100. A Global Position System (GPS) module is an example of the location information module. The GPS module receives location information of the mobile terminal 100 from a plurality of satellites. In this regard, the location information may include coordinate information represented with a latitude and longitude.

The communication unit 130 may transmit a social group join request message to the device of the second user and receive a social group join acceptance message from the device of the second user.

The communication unit 130 may receive link information to determine group activity information of the social group on the web from the social group management server 200.

The communication unit 130 may transmit content to the external device 400. In this regard, according to an exemplary embodiment of the present invention, the communication unit 130 may transmit the content in a message form to the external device 400.

For example, the communication unit 130 may transmit information regarding a predefined application or link information of a web browser to a device of a group member included in the social group. The communication unit 130 may transmit the content to a device of a group member included in the external SNS group or the external SNS server 300 corresponding to the external SNS group. The communication unit 130 may transmit the content to a device of a group member included in the instant group.

The storage unit 140 may store programs to be processed or controlled by the control unit 150 and may store input/output data, e.g., group information, group activity information, link information, private information, etc.

The storage unit 140 may include at least one storage medium from among a flash memory type storage medium, a hard disk type storage medium, a multimedia card micro type storage medium, a card type memory, e.g., a Secure Digital (SD) memory or an XD memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic disc, and an optical disc memory. In addition, the mobile terminal 100 may perform web storage in the Internet, as the storage unit 140.

The storage unit 140 may store the group activity information of the social group 141, group activity information of the external SNS group 143, and group activity information of the instant group 145.

The group activity information according to an exemplary embodiment of the present invention may include at least one of message information of a group member, photo information thereof, and bookmark information thereof. The bookmark information may include bookmarked music information, bookmarked web page information, bookmarked news article information, bookmarked paper information, bookmarked book information, bookmarked restaurant information, and the like.

The control unit 150 controls overall operations of the mobile terminal 100. For example, the control unit 150 performs controlling and processing related to the social group, the external SNS group, the instant group, a voice call, data communication, a video call, and the like. For example, the control unit 150 may control overall operations of the sensing unit 110, the capturing unit 120, the memory 130, the user input unit 110, the display unit 120, the communication unit 130, and the storage unit 150.

The control unit 150 may create the social group including the first user and the second user registered in the phone book. The control unit 150 may obtain the group activity information of the group member and add the obtained group activity information to the group share space. The control unit 150 may provide the group activity information added to the group share space through the phone book. In this regard, the control unit 150 may classify and provide the group activity information added to the group share space into predefined categories.

The control unit 150 may search for the device of the second user registered in the phone book present within a predefined distance from the mobile terminal 100 in response to the search request of the external device 400.

The control unit 150 may create the instant group including the third users and add the instant group 145 to the phone book in response to the request for creation of the instant group.

A method of creating a social group by using the elements of the mobile terminal 100 will now be described in detail with reference to FIG. 3.

Figure 3:
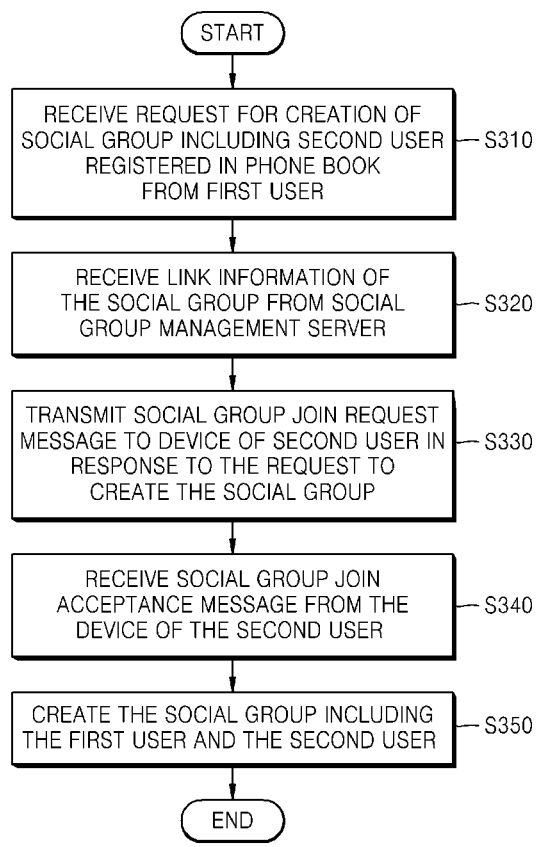
FIG. 3 is a flowchart illustrating a method of creating a social group according to an exemplary embodiment of the present invention.

FIG. 3 is a flowchart illustrating a method of creating a social group according to an exemplary embodiment of the present invention. The method of FIG. 3 includes operations that are sequentially performed by the elements of the mobile terminal 100 of FIG. 2. Thus, although not described here, the description of the mobile terminal 100 may in addition be applied to the method of FIG. 2.

Referring to FIG. 3, the mobile terminal 100 may receive a request for creation of the social group including a second user registered in a phone book from a first user at operation S310. According to an exemplary embodiment of the present invention, the request for creation of the social group may include a request for addition of a group member of a previously created social group.

According to an exemplary embodiment of the present invention, the first user may select a group member with whom to share group activity information from among second users registered in the phone book. Thus, the first user may easily create the social group including group members with whom a relationship is desired by the first user through the phone book.

The mobile terminal 100 may receive link information of the social group from the social group management server 200 at operation S320. In a case in which the first user requests to create the social group, the social group management server 200 may generate and transmit the link information corresponding to the social group to the mobile terminal 100.

In a case in which a device of the second user is a feature phone or has a different platform from that of the mobile terminal 100 of the first user, the link information of the social group may facilitate the second user to use an SNS through the web.

The link information according to an exemplary embodiment of the present invention may be a dynamically created URL. The link information according to an exemplary embodiment of the present invention may have a basic domain name or may be in a shortened URL form.

The mobile terminal 100 may transmit a social group join request message to the device of the second user in response to the request for creation of the social group at operation S330. In a case of a plurality of second users, the mobile terminal 100 may transmit social group join request messages to a plurality of devices of the plurality of second users. According to an exemplary embodiment of the present invention, the mobile terminal 100 may transmit the social group join request message to the device of the second user through the social group management server 200.

The mobile terminal 100 may receive a social group join acceptance message from the device of the second user at operation S340. According to an exemplary embodiment of the present invention, the mobile terminal 100 may receive the social group join acceptance message from the device of the second user through the social group management server 200.

In this case, the mobile terminal 100 creates the social group including the first user and the second user at operation 5350. In this regard, the first user and the second user recognize each other, and thus share group activity information in the social group.

Figure 4:
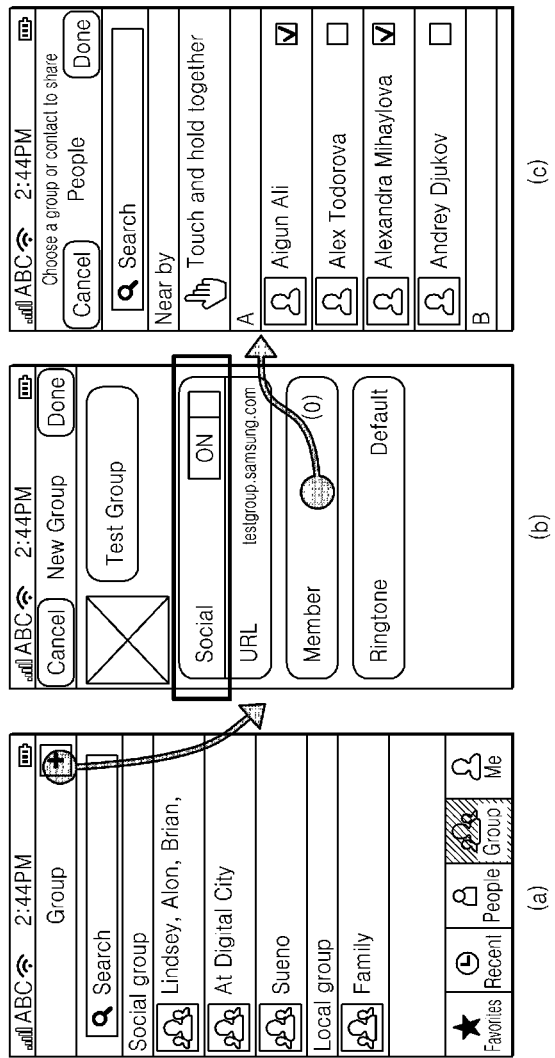
FIGS. 4A through 4C are screen images for creating a social group of a mobile terminal according to an exemplary embodiment of the present invention.
Figure 5:
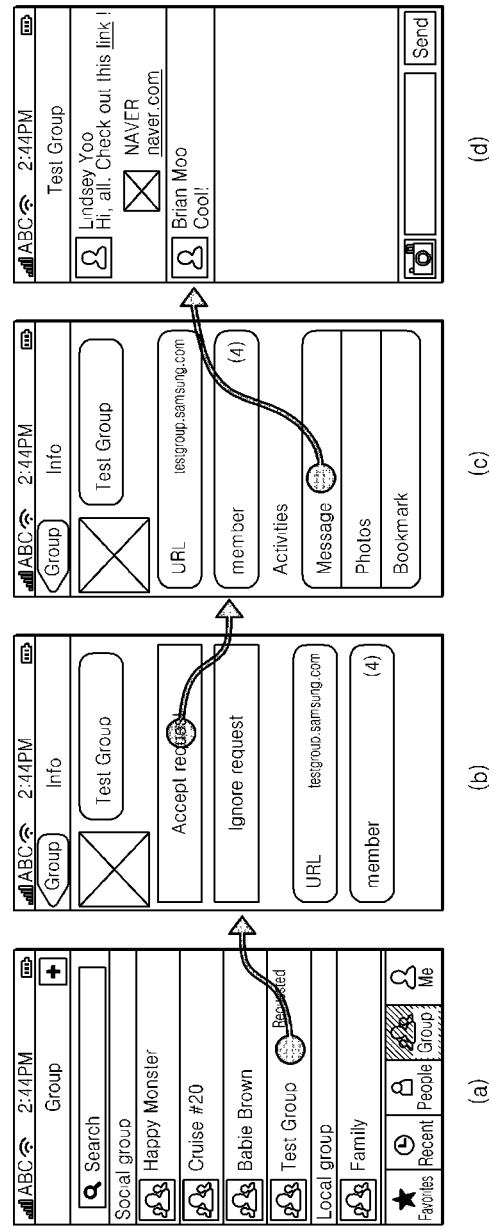
FIGS. 5A through 5D are screen images displaying a device of a second user that receives a social group join request message according to an exemplary embodiment of the present invention.

This will be described in more detail with reference to FIGS. 4 and 5.

FIGS. 4A through 4C are screen images for creating a social group of the mobile terminal according to an exemplary embodiment of the present invention.

Referring to FIG. 4A, a first user may execute a phone book of the mobile terminal 100 to create a new social group or local group. The local group is a group optionally classified by a user and does not share group activity information between group members. For example, the local group denotes a group provided by the phone book. Examples of the local group may include a family, a club, a job, and the like.

In a case in which the first user creates the social group, referring to FIG. 4B, the first user may convert a Social object into an ON status. The Social object according to an exemplary embodiment of the present invention may be in the form of a toggle switch. In a case in which the Social object is in the ON status, the mobile terminal 100 may receive link information corresponding to the social group from the social group management server 200.

Referring to FIG. 4C, the first user may select a group member of the social group from second users registered in a phone book. For example, the first user may select Alex and Alexandra as group members of the social group, e.g., a test group. In this case, the mobile terminal 100 may transmit social group join request messages to Alex's and Alexandra's devices.

FIGS. 5A through 5D are screen images displaying a device of a second user that receives a social group join request message according to an exemplary embodiment of the present invention.

Referring to FIG. 5A, the device of the second user may display a social group, e.g., a test group, that receives the social group join request message. In this regard, referring to FIG. 5B, in a case in which the second user intends to join the social group that receives the social group join request message, the second user may accept a join request of a first user. In this case, the device of the second user may transmit a social group join acceptance message to the mobile terminal 100.

Referring to FIGS. 5C and 5D, the second user may share group activity information with the first user and other group members as a group member of the social group.

An SNS providing method based on a phone book of the mobile terminal 100 will now be described in detail with reference to FIG. 6 below.

Figure 6:
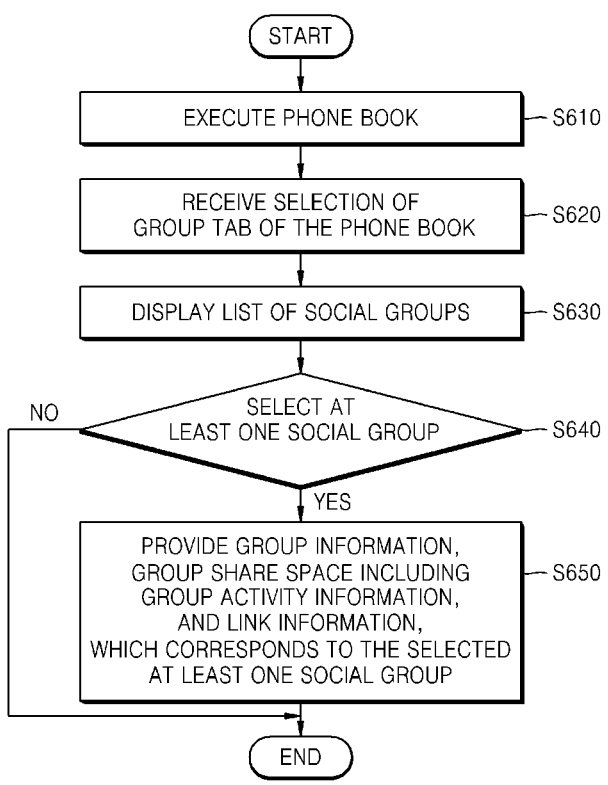
FIG. 6 is a flowchart illustrating a method of providing a SNS using a phone book according to an exemplary embodiment of the present invention.

FIG. 6 is a flowchart illustrating an SNS providing method based on a phone book according to an exemplary embodiment of the present invention.

Referring to FIG. 6, the SNS providing method based on the phone book according to an exemplary embodiment of the present invention includes operations that are sequentially performed by the elements of the mobile terminal 100 of FIG. 2. Thus, although not described here, the description of the mobile terminal 100 may in addition be applied to the SNS providing method based on the phone book of FIG. 6.

Figure 12:
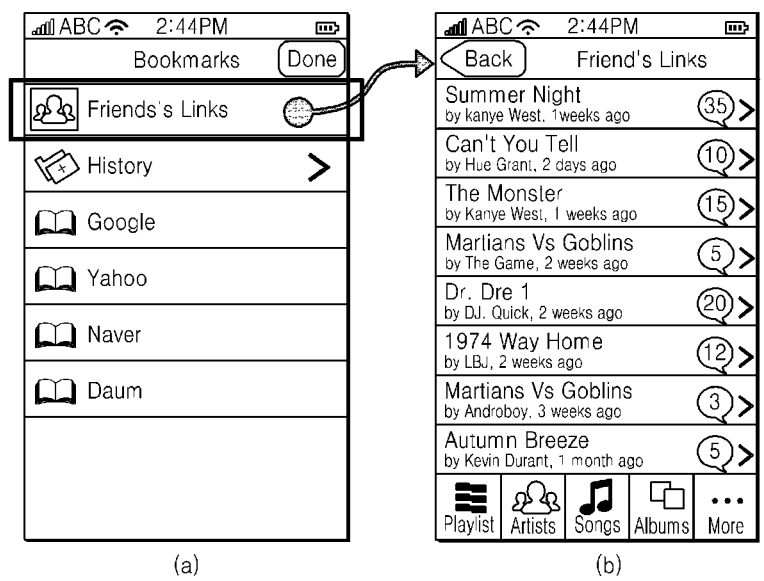
FIGS. 12A and 12B are screen images for explaining a method of determining bookmark information through a mobile web browser according to an exemplary embodiment of the present invention.

The mobile terminal 100 may execute the phone book at operation S610. The mobile terminal 100 may receive a first user's selection of a group tab of the phone book at operation S620. The phone book according to an exemplary embodiment of the present invention may include a plurality of tabs. For example, the phone book may include a favorites tab, a recent call tab, a contact tab, the group tab, a private information tab, and the like. This will be described in more detail with reference to FIG. 12.

The mobile terminal 100 may display a list of social groups in response to the selection of the group tab at operation S630. The list of social groups may include a social group name, a social group member, a social group identification icon, a photo, and the like.

The mobile terminal 100 may receive a first user's selection of at least one social group included in the social group list at operation 5640. In this case, the mobile terminal 100 provides at least one of group information corresponding to the at least one social group selected by the first user, a group share space including group activity information, and link information at operation 5650.

The group information according to an exemplary embodiment of the present invention may include a group name, a group image, a group member, and the like.

The group share space according to an exemplary embodiment of the present invention denotes a region in which group activity information of the group member is stored. The mobile terminal 100 may obtain group activity information of the first user or a second user and add the obtained group activity information to the group share space.

The group activity information according to an exemplary embodiment of the present invention may include message information, photo information, bookmark information, music information, video information, document information, and the like, that correspond to a social group. For example, provided that a social group OOO includes group members A, B, and C, messages between the group members A, B, and C, photos of the group members A, B, and C, and bookmark information of each of the group members A, B, and C may be group activity information of the social group OOO.

Figure 7:
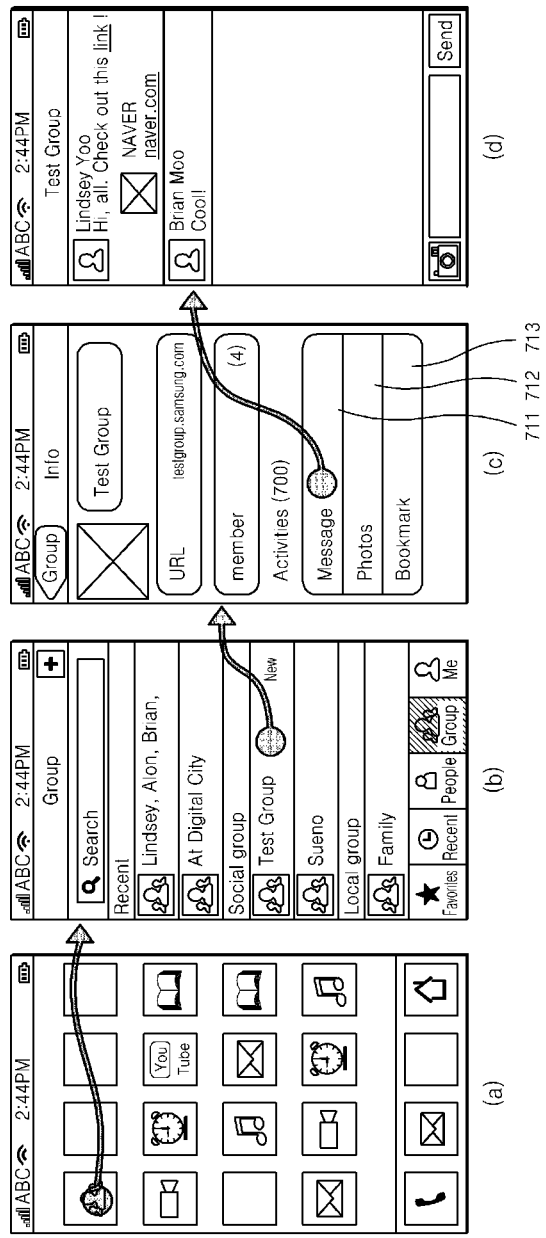
FIGS. 7A through 7D are screen images displaying information regarding a social group in a group tab of a phone book according to an exemplary embodiment of the present invention.

According to an exemplary embodiment of the present invention, the first user may easily determine the group activity information of the social group through the phone book. This will be described in more detail with reference to FIG. 7 below.

FIGS. 7A through 7D are screen images for providing information regarding a social group in a group tab of a phone book according to an exemplary embodiment of the present invention.

Referring to FIG. 7A, a first user may execute the phone book of the mobile terminal 100 and select the group tab of the phone book. The group tab may be selected by a touch or a tap gesture of the first user.

In this case, referring to FIG. 7B, the mobile terminal 100 may display a list of groups registered in the phone book in response to the selection of the group tab. The list of groups may include a list of social groups, an external SNS group list, an instant group list, a recent call group list, and the like.

Referring to FIG. 7C, in a case in which the first user selects at least one social group, e.g., a test group, from the list of social groups, the mobile terminal 100 may provide group information, a group share space 700, link information, and the like, that correspond to the selected at least one social group.

The group share space 700 may include a message tab 711 for providing message information, a photo tab 712 for providing photo information, a bookmark tab 713 for providing bookmark information, and the like.

Referring to FIG. 7D, according to an exemplary embodiment of the present invention, in a case in which the first user selects the message tab 711 of the group share space 700, the mobile terminal 100 may display a chat between group members on a message window. In this regard, the first user may determine a conversation between social group members and input additional content to be shared into the message window.

According to an exemplary embodiment of the present invention, in a case in which the first user selects the photo tab 712 of the group share space 700, the mobile terminal 700 may display photos of group members, a capture image, video, and the like.

Figure 11:
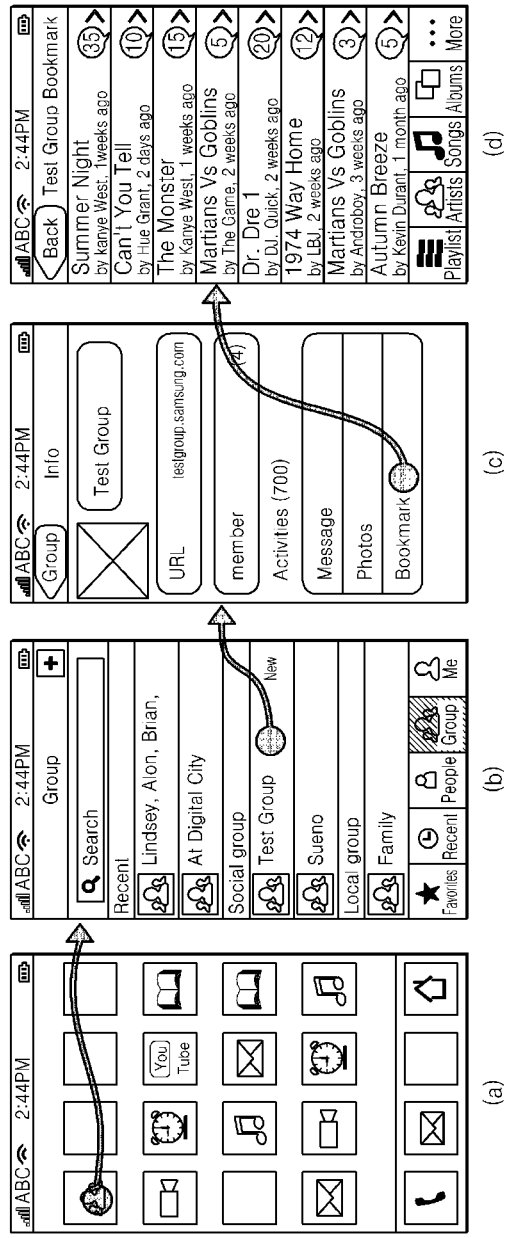
FIGS. 11A through 11D are screen images for explaining a method of determining bookmark information of a social group through a phone book according to an exemplary embodiment of the present invention.

In addition, according to an exemplary embodiment of the present invention, in a case in which the first user selects the bookmark tab 713 of the group share space 700, the mobile terminal 700 may provide information bookmarked by group members. For example, the mobile terminal 700 may provide a bookmark web page, bookmarked music, a bookmarked tour place, and the like. This will be described in more detail with reference to FIGS. 11 and 12.

Figure 8:
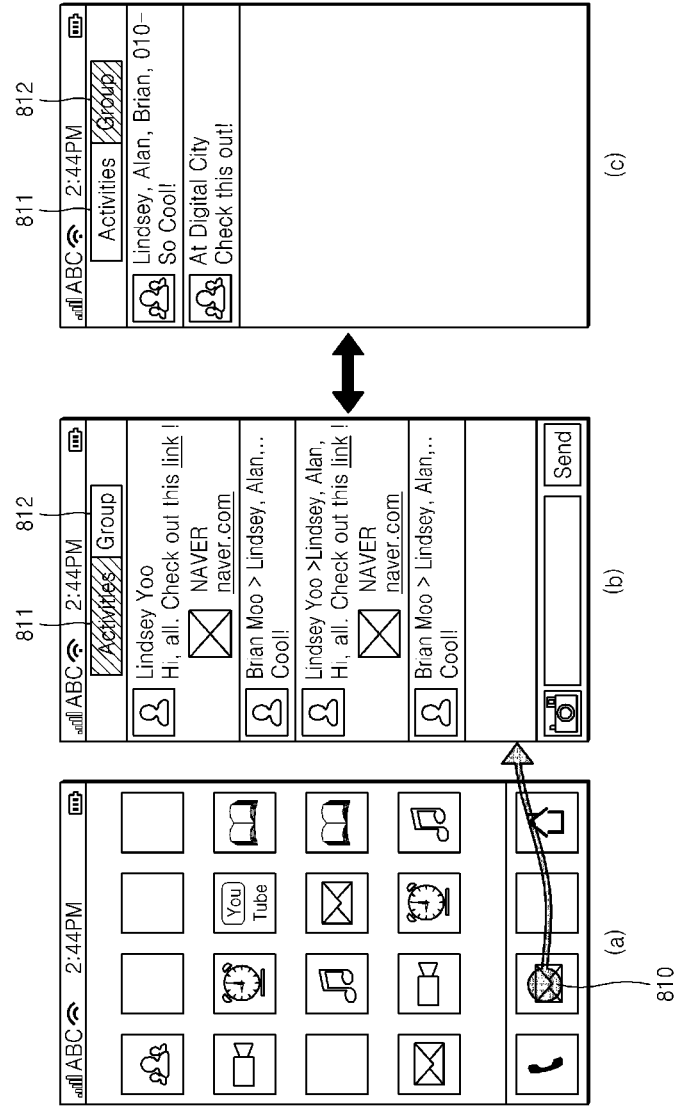
FIGS. 8A through 8C are screen images displaying group activity information of a social group in a message application according to an exemplary embodiment of the present invention.

FIGS. 8A through 8C are screen images for providing group activity information of a social group in a message application according to an exemplary embodiment of the present invention.

Referring to FIG. 8A, the mobile terminal 100 may execute the message application 810 based on an input of a first user. In this regard, referring to FIGS. 8B and 8C, the mobile terminal 100 may provide a group activity information tab 811 and a group tab 812 through the message application.

The group activity information tab 811 may display the group activity information corresponding to the social group. For example, the group activity information tab 811 may display chat information of social group members. The group tab 812 may display a list of social groups.

According to an exemplary embodiment of the present invention, existing message use experiences of group members may extend to group SNS experiences thereof. Thus, users may become familiar with the use of an SNS.

FIGS. 9A through 9E are screen images for explaining external SNS groups according to an exemplary embodiment of the present invention.

Figure 9:
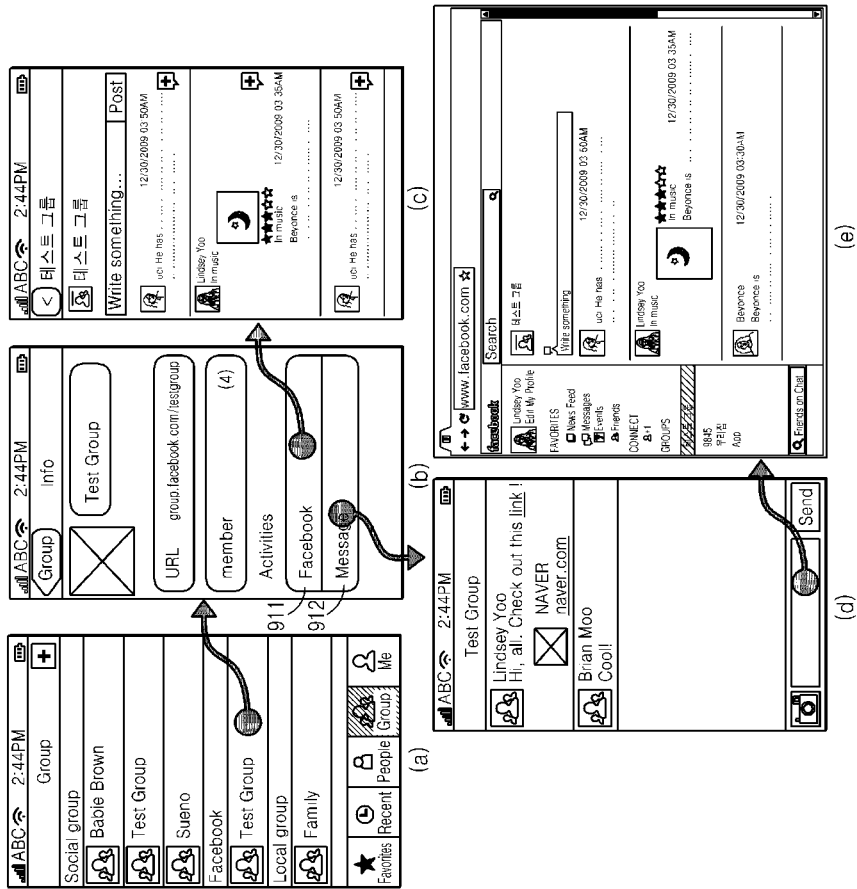
FIGS. 9A through 9E are screen images for explaining external SNS groups according to an exemplary embodiment of the present invention.

Referring to FIG. 9A, according to an exemplary embodiment of the present invention, the mobile terminal 100 may display an external SNS group list that classifies second users who use external SNSs for each external SNS in response to a first user's selection of a group tab of a phone book.

For example, the mobile terminal 100 may classify second users who use Facebook into a Facebook group and second users who use Twitter into a Twitter group. In this regard, the mobile terminal 100 displays the external SNS group list including the Facebook group, the Twitter group, and the like.

Referring to FIG. 9B, in a case in which the first user selects at least one external SNS group, the mobile terminal 100 may provide group information corresponding to the selected at least one external SNS group, a group share space including group activity information, link information, and the like. In a case in which the Facebook group is selected from the external SNS group list, information regarding the Facebook group including second users who use Facebook and are registered in the phone book of the mobile terminal 100 may be displayed. For example, a name (e.g., test group) of the Facebook group, members (e.g., a total of 4 group members 1, 2, 3, and 4) thereof, link information (e.g., group.facebook.com/test group) used to access the Facebook web page, a share space Activities thereof, and the like.

Referring to FIG. 9C, in a case in which the first user selects a Facebook tab 911 of the group share space, the mobile terminal 100 may provide group activity information of the Facebook group in synchronization with a Facebook server.

Referring to FIG. 9D, in a case in which the first user selects the message tab 912 of the group share space, the mobile terminal 100 may display chat between group members on a message window.

The mobile terminal 100 may obtain group activity information of external SNS groups. The mobile terminal 100 may transmit the obtained group activity information to the external SNS server 300 corresponding to external SNS groups.

For example, referring to FIG. 9E, the mobile terminal 100 may transmit conversion between members of the Facebook group to the Facebook server. In this case, members of the Facebook group may determine their conversation through the Facebook website.

Figure 10:
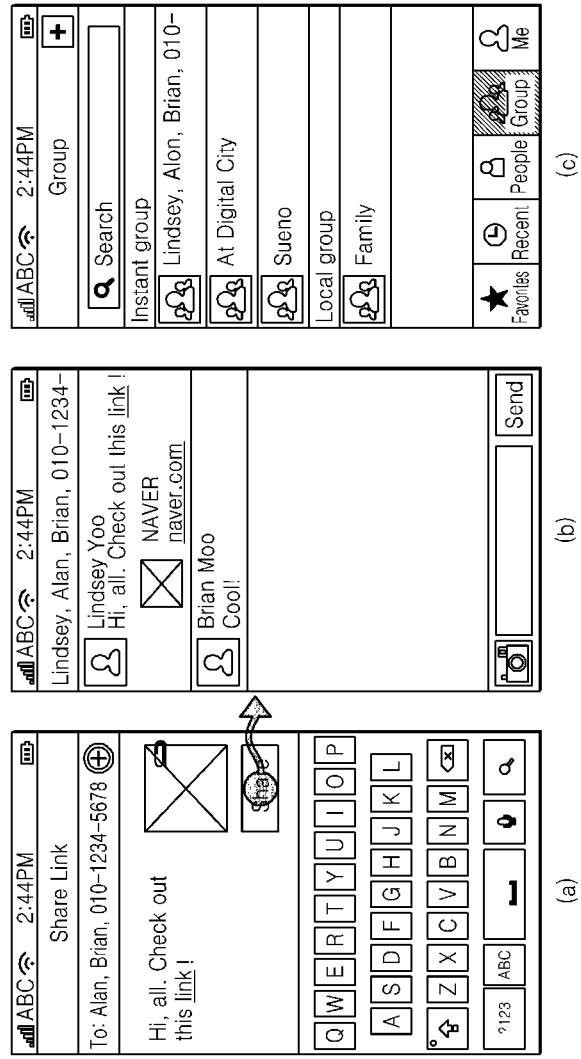
FIGS. 10A through 10C are screen images for explaining a method of creating an instant group according to an exemplary embodiment of the present invention.

FIGS. 10A through 10C are screen images for explaining a method of creating an instant group according to an exemplary embodiment of the present invention.

The instant group is a group optionally created by a first user and does not exhibit special relationships or common characteristics between group members. The instant group according to an exemplary embodiment of the present invention may include a plurality of third users to which the first user transmits the same message.

For example, referring to FIGS. 10A and 10B, the first user may simultaneously transmit predefined content to a friend A Alan's device, a friend B Brian's device, and a friend C 010-1234-5678's device by setting the friend A, the friend B, and the friend C as recipients. In this regard, if there are many cases in which the first user sends messages to the friends A, B, and C simultaneously, the first user may request the mobile terminal 100 to create the instant group including the friends A, B, and C.

Referring to FIG. 10C, the mobile terminal 100 may create the instant group including the friends A, B, and C in response to the request for creation of the instant group. In addition, the mobile terminal 100 may add the instant group including the friends A, B, and C to a phone book. Thus, the first user may easily find the instant group in the phone book to easily share content with members of the instant group.

FIGS. 11A through 11D are screen images for explaining a method of determining bookmark information of a predefined social group through a phone book according to an exemplary embodiment of the present invention.

Referring to FIGS. 11A through 11C, a first user may determine the bookmark information of the predefined social group through the phone book. For example, referring to FIG. 11D, in a case in which the first user selects a bookmark tab with respect to a test group of social groups from the phone book, the mobile terminal 100 may display a list of information bookmarked by group members of the test group. For example, according to an exemplary embodiment of the present invention, the first user may determine the bookmark information for each social group through the phone book.

FIGS. 12A and 12B are screen images for explaining a method of determining bookmark information through a mobile web browser, according to an exemplary embodiment of the present invention.

Referring to FIG. 12A, the mobile terminal 100 may execute the mobile web browser based on an input of a first user. In this regard, if the first user selects a bookmark tab on the mobile web browser, referring to FIG. 12B, the mobile terminal 100 may provide a bookmark list of all social groups.

For example, provided that a social group A includes bookmark information a, b, and c, a social group B includes bookmark information d, e, and f, and a social group C includes bookmark information g, h, and i, if the first user selects the social group A and a bookmark tab from group activity information of the social group A through the phone book, the mobile terminal 100 displays only a list of a, b, and c that is the bookmark information of the social group A.

However, if the first user selects the bookmark tab on the mobile web browser, the mobile terminal 100 displays a list of a, b, c, d, e, f, g, h, and i that is the bookmark information of all of the social groups A, B, and C.

Figure 13:
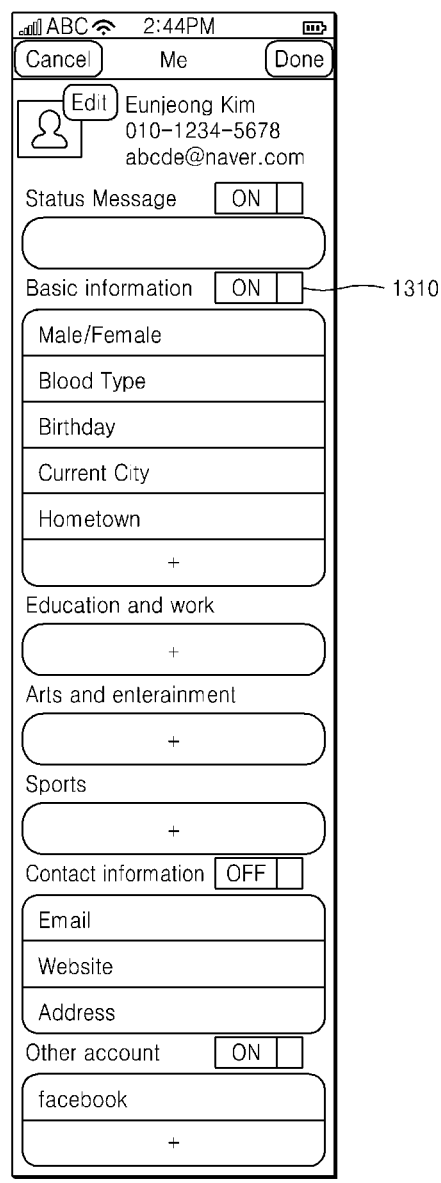
FIG. 13 is a screen image for explaining a private information tab of a phone book according to an exemplary embodiment of the present invention.

FIG. 13 is a screen image for explaining a private information tab of a phone book according to an exemplary embodiment of the present invention.

The mobile terminal 100 may receive a selection of the private information tab of the phone book from a first user. In this case, the mobile terminal 100 may display private information of the first user in response to the selection of the private information tab.

The private information may include, for example, the first user's name, phone number, email address, sex, blood type, residence, hometown, job, education background, interests, external SNS use information (e.g., a name of an external SNS, account information thereof), and the like.

According to an exemplary embodiment of the present invention, the mobile terminal 100 may provide a setting object 1310 for setting a public range of the private information of the first user for each piece of private information. For example, the mobile terminal 100 may provide the setting object 1310 in a toggle switch. In this regard, the first user may selectively determine whether to go public the private information according to profundity of the privation information.

According to another exemplary embodiment of the present invention, the first user may differently set the public range of the private information for each social group. In this case, the mobile terminal 100 may provide different pieces of the private information of the first user for each social group.

In a case in which the private information is obtained from the first user, the mobile terminal 100 may authenticate the obtained private information. For example, the mobile terminal 100 may authenticate the phone number through a Short Message Service (SMS), and authenticate the email address by emailing. Thus, according to an exemplary embodiment of the present invention, the private information is authenticated, thereby forming a reliable social group.

According to an exemplary embodiment of the present invention, in a case in which the private information is obtained from the first user, the social group management server 20 may automatically create a web page of the private information of the first user.

FIGS. 14A through 14E are screen images for explaining a phone book according to an exemplary embodiment of the present invention.

Referring to FIGS. 14A through 14E, the phone book according to an exemplary embodiment of the present invention may include a favorites tab 1410, a recent call tab 1420, a contact tab 1430, a group tab 1440, and a private information tab 1450.

Figure 14:
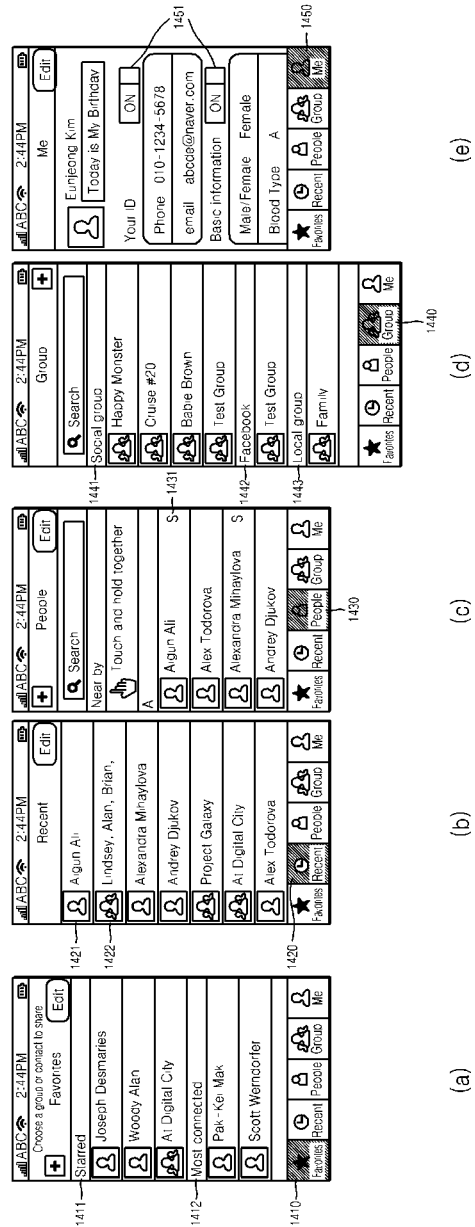
FIGS. 14A through 14E are screen images for explaining a phone book according to an exemplary embodiment of the present invention.

FIG. 14A is a screen image for a case in which a first user selects the favorites tab 1410 of the phone book.

The mobile terminal 100 may receive a selection of the favorites tab 1410 of the phone book from the first user. In this case, the mobile terminal 100 may provide a list 1411 of second users added to the favorites by the first user and a list 1412 of second users who communicate with the first user for a predefined period of time more than a predefined number of times.

For example, referring to FIG. 14A, the mobile terminal 100 may provide the list 1411 of second users added to the favorites by the first user through the favorites tab 1410. In this regard, the list 1411 of second users may include groups as well as individuals.

In addition, the mobile terminal 100 may provide the list 1412 of second users who communicate with the first user for a predefined period of time more than a predefined number of times. For example, the mobile terminal 100 may provide persons/groups who have most frequently contacted the first user recently.

FIG. 14B is a screen image for a case in which the first user selects the recent call tab 1420 of the phone book.

The mobile terminal 100 may receive a selection of the recent call tab 1420 of the phone book from the first user. In this case, the mobile terminal 100 may provide a list of second users who communicate with the first user within a predefined period of time from the current time. For example, the mobile terminal 100 may arrange and provide the list of second users in the sequence of recent calls. The list of the second users may include an individual 1421 or a group 1422.

FIG. 14C is a screen image for a case in which the first user selects the contact (e.g. "people") tab 1430 of the phone book. A contact list of the phone book may be displayed as profiles of second users, names thereof, and the like. In addition, the contact list of the phone book may display second users 1431 who own devices providing social group functions.

The mobile terminal 100 may receive an external device search request of the first user. The mobile terminal 100 may search for devices of second users registered in the phone book located within a predefined distance from the mobile terminal 100 in response to the external device search request. The mobile terminal 100 may provide a list of the second users who own the found devices. This will be described in more detail with reference to FIGS. 16A through 16D.

FIG. 14D is a screen image for a case in which the first user selects the group tab 1440 of the phone book. As described above, in a case in which the group tab 1440 of the phone book is selected, the mobile terminal 100 may provide at least one group list of a social group list 1441, an external SNS group list 1442, a local group list 1443, and an instant group list.

FIG. 14E is a screen image for a case in which the first user selects the private information tab 1450 of the phone book. As described above, in a case in which the private information tab 1450 of the phone book is selected, the mobile terminal 100 may provide private information of the first user and a setting object 1451 for setting a public range of the private information of the first user for each piece of private information.

According to an exemplary embodiment of the present invention, the first user may easily create and manage groups through a phone book, and, even in a case in which the first user is not familiar with an SNS, may easily join the SNS, invite friends, and share information through the phone book.

A method of sharing content with a social group, an external SNS group, and an instant group through a phone book, performed by the mobile terminal 100, will now be described in detail with reference to FIG. 15.

Figure 15:
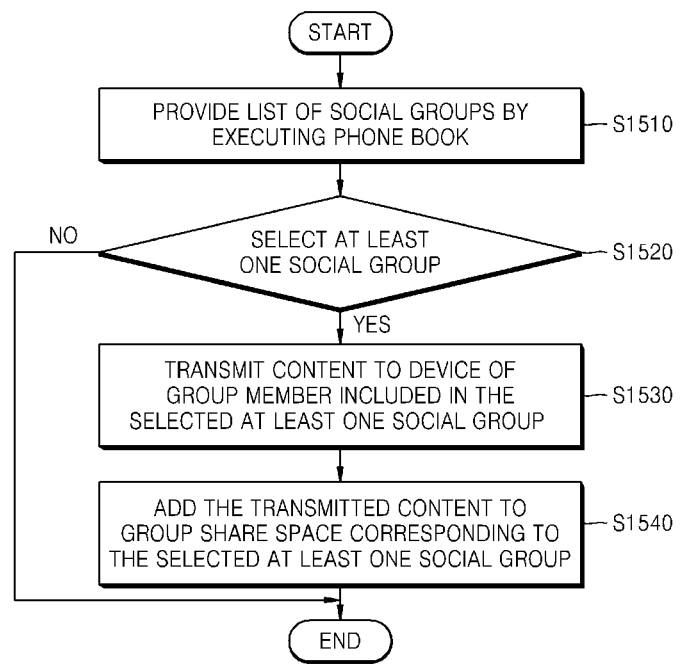
FIG. 15 is a flowchart illustrating a content sharing method according to an exemplary embodiment of the present invention.

FIG. 15 is a flowchart illustrating a content sharing method, according to an exemplary embodiment of the present invention.

The content sharing method according to an exemplary embodiment of the present invention of FIG. 15 includes operations that are sequentially performed by the elements of the mobile terminal 100 of FIG. 2. Thus, although not described here, the description of the mobile terminal 100 may in addition be applied to the content sharing method of FIG. 15.

Referring to FIG. 15, according to an exemplary embodiment of the present invention, the mobile terminal 100 may execute a phone book to provide a list of social groups that shares group activity information of group members at operation S1510. According to an exemplary embodiment of the present invention, the mobile terminal 100 may provide the list of social groups by executing the phone book in a case in which a request of a first user to share at least one piece of content with group members is received.

According to an exemplary embodiment of the present invention, the mobile terminal 100 may receive a request for sharing content with social group members from the first user during an execution of a predefined application or web browser. In this case, the content according to an exemplary embodiment of the present invention may be information regarding the predefined application or link information of the predefined web browser. This will be described with reference to FIGS. 16A through 16D.

FIGS. 16A through 16D are screen images for providing a list of social groups according to an exemplary embodiment of the present invention.

Figure 16:
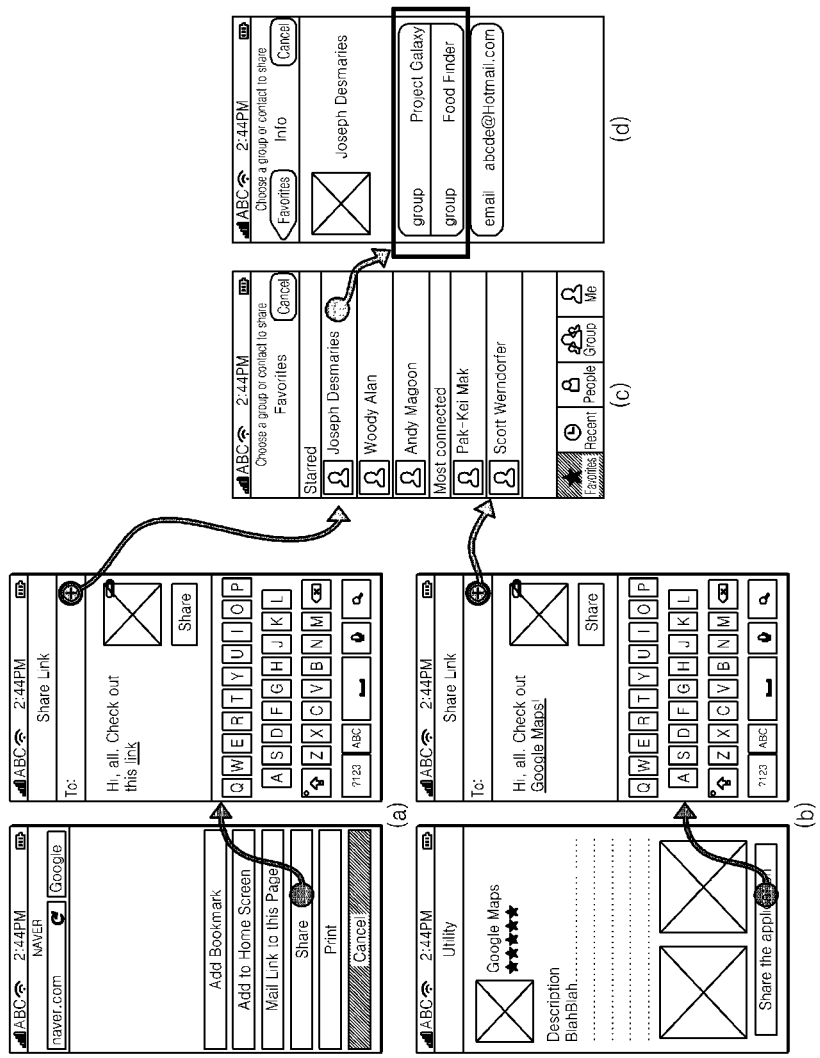
FIGS. 16A through 16D are screen images for providing a list of social groups according to an exemplary embodiment of the present invention.

Referring to FIG. 16A, according to an exemplary embodiment of the present invention, the first user may input a share request to share an activated web browser with social group members. In this case, the mobile terminal 100 may provide the first user with a list of social groups by executing a phone book in such a way that the first user may share link information of the web browser with social group members.

Referring to FIG. 16B, according to an exemplary embodiment of the present invention, the first user may input a share request to recommend the application to social group members. In this case, the mobile terminal 100 may provide the first user with the list of social groups by executing the phone book in such a way that the first user may share information regarding the application with social group members.

According to an exemplary embodiment of the present invention, the mobile terminal 100 may provide the list of social groups through a group tab of the phone book. In addition, according to an exemplary embodiment of the present invention, the mobile terminal 100 may display a list of second users registered in the phone book, and, if selection of at least one second user of the list of second users is received from the first user, may provide a list of social groups in which the selected at least one second user joins.

For example, referring to FIG. 16C, in a case in which the mobile terminal 100 displays the list of second users by executing the phone book, the first user may select a friend Joseph of the first user from a favorites tab.

In this regard, referring to FIG. 16D, the mobile terminal 100 may provide a list (e.g., Project Galaxy, Food Finder) of social groups having Joseph as a group member.

Referring back to FIG. 15, the mobile terminal 100 may receive a selection of at least one social group included in the list of social groups at operation S1520. In this regard, according to an exemplary embodiment of the present invention, the first user may personally search for the at least one group in the phone book. The mobile terminal 100 may receive selections of a plurality of social groups. This will be described with reference to FIGS. 17A through 17C.

Figure 17:
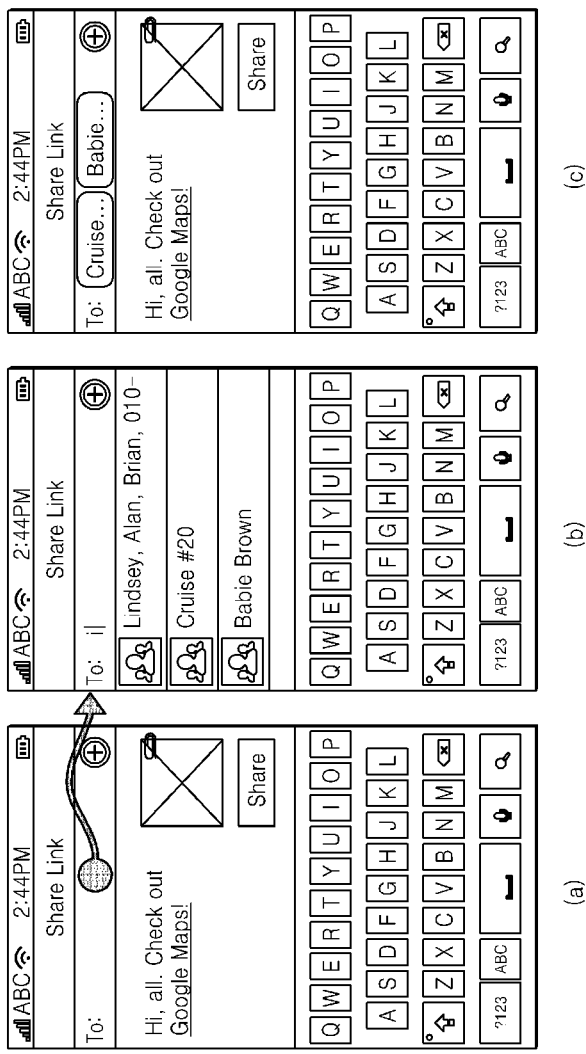
FIGS. 17A through 17C are screen images for transmitting content to a plurality of social groups according to an exemplary embodiment of the present invention.

FIGS. 17A through 17C are screen images for transmitting content to a plurality of social groups according to an exemplary embodiment of the present invention.

Referring to FIG. 17A, the mobile terminal 100 may receive a share request of a first user with respect to a predefined application. In this regard, referring to FIG. 17B, the mobile terminal 100 may provide a phone book with a search window so that the first user may personally search for a social group.

In addition, referring to FIG. 17C, the mobile terminal 100 may receive selections of a plurality of social groups, e.g., Cruise #20, Babie Brown, included in a list of social groups from the first user.

Referring back to FIG. 15, the mobile terminal 100 may transmit at least one piece of content selected by the first user of the mobile terminal 100 to a device of a group member included in the selected at least one social group at operation S1530.

According to an exemplary embodiment of the present invention, in a case in which selections of a plurality of social groups are received, the mobile terminal 100 may transmit the at least one piece of content selected by the first user to devices of group members included in each of the social groups.

The mobile terminal 100 may add the at least one piece of content transmitted to the device of the group member to a group share space corresponding to the at least one social group at operation S1540. The group share space is a region in which group activity information corresponding to a social group is stored and may be determined through the phone book of the mobile terminal 100 or a message application. For example, the at least one piece of content transmitted to the device of the group member may be added to the group share space as group activity information of the at least one social group.

According to an exemplary embodiment of the present invention, the mobile terminal 100 may add the at least one piece of content transmitted to devices of group members included in each of the social groups to a group share space corresponding to each of the social groups. For example, in a case in which information regarding a map application is transmitted to a device of each of group members of social groups A and B, the mobile terminal 100 may add the information regarding the map application to a group share space of the social group A and a group share space of the social group B.

According to an exemplary embodiment of the present invention, in a case in which a share request of the first user is received, the mobile terminal 100 may provide an external SNS group list by executing a phone book. In this regard, the mobile terminal 100 may receive a selection of at least one external SNS group included in the external SNS group list from the first user.

The mobile terminal 100 transmits content to a device of a group member included in the selected at least one external SNS group or an external SNS server corresponding thereto. In addition, the mobile terminal 100 may add content to a group share space corresponding to the selected at least one external SNS group.

According to another exemplary embodiment of the present invention, in a case in which the share request of the first user is received, the mobile terminal 100 may provide an instant group list by executing the phone book. In this regard, the mobile terminal 100 may receive a selection of at least one instant group included in the instant group list from the first user. The mobile terminal 100 may transmit content to a device of a group member included in the selected at least one instant group.

According to an exemplary embodiment of the present invention, in a case in which the share request of the first user is received, the mobile terminal 100 may provide the first user with a list of second users who own devices located in a near distance therefrom. This will be described with reference to FIGS. 18A through 18C.

FIGS. 18A through 18C are screen images for searching for and providing devices of second users located within a predefined distance from the mobile terminal according to an exemplary embodiment of the present invention.

Referring to FIG. 18A, the mobile terminal 100 may receive an external device search request from a first user. According to an exemplary embodiment of the present invention, the first user may request a search for a device present at a near distance through a predefined gesture. An example of the predefined gesture may be tapping or a touch and hold gesture.

The term 'tapping' may be understood as a user touching a screen with a finger or a stylus at very high speeds. In other words, the term 'tapping' denotes a case in which a time period between when touch-in is done and when touch-out is done is very short. Touch-in denotes a user touching a screen with a finger or a stylus and touch-out denotes taking the finger or the stylus off from the screen.

The term 'touching and holding' denotes a user touching a screen with a finger or a stylus and maintaining the touching for a threshold period of time or longer. For example, the term 'touching and holding' denotes a case in which a time period between when touch-in is done and when touch-out is done is equal to or greater than the threshold period of time. If a touch input is maintained for a threshold period of time or longer, a video or audio feedback signal may be provided to the user so that the user may determine whether the touch input is a tapping operation or a touch-and-hold operation.

The mobile terminal 100 searches for devices of second users registered in a phone book located within the predefined distance from the mobile terminal 100 in response to the external device search request.

According to an exemplary embodiment of the present invention, the mobile terminal 100 may request a second user list present within the predefined distance from the social group management server 200. In this case, the social group management sever 200 may extract devices of second users located within the predefined distance from the mobile terminal 100 based on location information received from devices of second users. The social group management server 200 may transmit the second user list corresponding to the extracted devices to the mobile terminal 100.

According to another exemplary embodiment of the present invention, the mobile terminal 100 may search for devices of second users present within the predefined distance through NFC, such as Bluetooth, etc.

Bluetooth is a standard for lower power wireless communication at a near distance between wireless communication devices. NFC is a near distance wireless connection method based on magnetic induction between near devices that enables communication in any direction.

Referring to FIG. 18B, the mobile terminal 100 may provide the first user with a second user list corresponding to devices that are found to be located within the predefined distance. In this regard, the mobile terminal 100 may receive a selection of at least one second user included in the second user list from the first user. For example, the first user may select colleagues A Aigun and B Alexandra that have a meeting in the same meeting room. The mobile terminal 100 transmits content to devices of the selected colleagues A Aigun and B Alexandra.

Referring to FIG. 18C, only in a case in which it is set to search for a device 1620 of a second user, the mobile terminal 100 may search for the device 1620 of the second user present at a near distance. For example, the second user blocks an external device from being searched so that a location of the second user may not be exposed.

According to an exemplary embodiment of the present invention, a user of the mobile terminal 100 may easily access an SNS through an experience that uses a phone book. In addition, according to an exemplary embodiment of the present invention, the user of the mobile terminal 100 may easily constitute a social group with persons who are registered in the phone book and constitute a social group with persons only desired by himself/herself.

According to an exemplary embodiment of the present invention, the user of the mobile terminal 100 may easily share group activity information with social group members through an experience that uses the phone book/messages.

The above exemplary embodiments of the present invention may be embodied as program commands and may be stored in a non-transitory computer readable recording medium. The non-transitory computer readable recording medium may store program commands, data files, data structures, or a combination thereof. Program commands that may be stored in the non-transitory computer readable recording medium may be specially designed and constructed for the present invention or may be well known to those in the computer software field to which the present invention pertains. Examples of the non-transitory computer readable medium are a magnetic recording medium, e.g., a hard disc, a floppy disc, a magnetic tape, etc.; an optical recording medium, e.g., a Compact Disc (CD)-ROM, a DVD, etc.; a magneto-optical medium, e.g., an optical disk; and a hardware device, e.g., a ROM, a RAM, a flash memory, which is constructed to store and execute program commands. Examples of a program command include mechanical language code that may be made, for example, by using a compiler, and high-level language code that may be executed in a computer, for example, by using an interpreter.

While the present invention has been shown and described with reference to exemplary embodiments thereof, it will be understood by those skilled in the art that various changes in form and details may be made therein without departing from the spirit and scope of the present invention as defined by the following claims and equivalents.

What is claimed is:

1. A method of sharing content, performed by a mobile terminal, the method comprising:
   executing a phone book application managing contact information in the mobile terminal;
   displaying, on an execution window of the phone book application, a list of individual contacts and social groups, the social groups sharing group activity information of a group member by executing the phone book application, the list of social groups is displayed based on a social group consisting of users registered in the phone book application, an external Social Networking Service (SNS) group, an instant group generated in response to a request for creation of the instant group, and a local group;
   limiting the display of the list of individual contacts and social groups such that only a list of social groups is displayed on the execution window of the phone book application in response to receiving a selection of a groups tab in the phone book application;
   receiving a selection of at least one social group from the list of social groups;
   transmitting at least one piece of content selected by a first user of the mobile terminal to at least one device corresponding to at least one group member included in the selected at least one social group; and
   adding the transmitted at least one piece of content to a group share space corresponding to the selected at least one social group, the group share space being provided in the execution window of the phone book application.

2. The method of claim 1, wherein the providing of the list of social groups comprises:
   displaying a list of second users registered in the phone book application;
   receiving from the first user a selection of at least one second user from the list of second users; and
   providing a list of social groups that the selected at least one second user joins.

3. The method of claim 1,
   wherein the receiving of the selection of the at least one social group comprises receiving selections of a plurality of social groups,
   wherein the transmitting of the at least one piece of content comprises transmitting the at least one piece of content selected by the first user of the mobile terminal to devices of group members included in each of the plurality of social groups, and
   wherein the adding of the transmitted at least one piece of content comprises adding the transmitted at least one piece of content to a group share space corresponding to each of the plurality of social groups.

4. The method of claim 1, wherein the providing of the list of social groups comprises:
   receiving a share request to share the at least one piece of content with the group member from the first user; and
   providing the list of social groups by executing the phone book application in response to the share request.

5. The method of claim 1, wherein the at least one piece of content comprises at least one piece of information regarding a predefined application or link information of a web browser.

6. The method of claim 1, wherein the group activity information comprises at least one piece of information selected from among message information, photo information, bookmark information, music information, video information, and document information of the group member.

7. The method of claim 1, further comprising:
   providing an external SNS group list on the execution window of the phone book application;
   receiving a selection of at least one external SNS group from the external SNS group list from the first user;
   transmitting the at least one piece of content to a device of a group member included in the selected at least one external SNS group or to an external SNS server corresponding to the selected at least one external SNS group; and
   adding the at least one piece of content to a group share space corresponding to the selected at least one external SNS group.

8. The method of claim 1, further comprising:
   providing an instant group list on the execution window of the phone book application;

receiving from the first user a selection of at least one instant group from the instant group list; and transmitting the at least one piece of content to a device of a group member included in the selected at least one instant group.

9. The method of claim 8, wherein the providing of the instant group list comprises:

transmitting messages to devices of a plurality of third users selected by the first user;

receiving a request to create an instant group from the first user with respect to the plurality of third users to which the messages are transmitted; and creating an instant group including the plurality of third users and adding the created instant group to the phone book application in response to the instant group creation request.

10. The method of claim 1, further comprising:

receiving an external device search request from the first user;

searching for devices of second users registered in the phone book application that are located within a predefined distance from the mobile terminal in response to the external device search request;

providing a list of second users corresponding to the found devices;

receiving from the first user a selection of at least one second user from the list of second users; and transmitting the at least one piece of content to a device of the selected at least one second user.

11. A non-transitory computer readable recording medium having recorded thereon a computer program for executing the method of sharing content of claim 1.

12. A mobile terminal comprising:

a display configured to display, on an execution window of a phone book application, a list of individual contacts and social groups, the social groups sharing group activity information of a group member by executing the phone book application, the list of social groups is displayed based on a social group consisting of users registered in the phone book application, an external Social Networking Service (SNS) group, an instant group generated in response to a request for creation of the instant group, and a local group;

a user input device configured to:
receive a selection of a groups tab in the phone book application, and
receive a selection of at least one social group from the list of social groups;

a transceiver configured to transmit at least one piece of content selected by a first user of the mobile terminal to at least one device corresponding to at least one group member included in the selected at least one social group; and at least one processor configured to:
execute the phone book application managing contact information in the mobile terminal,
limit the display of the list of individual contacts and social groups such that only a list of social groups is displayed on the execution window of the phone book application in response to the received selection of the groups tab in the phone book application, and
add the transmitted at least one piece of content to a group share space corresponding to the selected at least one social group, the group share space being provided in the execution window of the phone book application.

13. The mobile terminal of claim 12, wherein the display is further configured to display a list of second users registered in the phone book application, and, when at least one second user is selected from the list of second users by the first user, provide a list of social groups that the selected at least one second user joins.

14. The mobile terminal of claim 12,
wherein the user input device is further configured to receive selections of a plurality of social groups,
wherein the transceiver is further configured to transmit the at least one piece of content selected by the first user of the mobile terminal to devices of group members included in each of the plurality of social groups, and
wherein the at least one processor is further configured to add the transmitted at least one piece of content to a group share space corresponding to each of the plurality of social groups.

15. The mobile terminal of claim 12,
wherein the user input device is further configured to receive a share request to share the at least one piece of content with the group member from the first user, and
wherein the display is further configured to provide the list of social groups by executing the phone book application in response to the share request.

16. The mobile terminal of claim 12, wherein the at least one piece of content comprises at least one piece of information regarding a predefined application or link information of a web browser.

17. The mobile terminal of claim 12, wherein the group activity information comprises at least one piece of information selected from among message information, photo information, bookmark information, music information, video information, and document information of the group member.

18. The mobile terminal of claim 12,
wherein the display is further configured to provide an external SNS group list on the execution window of the phone book application,
wherein the user input device is further configured to receive a selection of at least one external SNS group from the external SNS group list from the first user,
wherein the transceiver is further configured to transmit the at least one piece of content to a device of a group member included in the selected at least one external SNS group or to an external SNS server corresponding to the selected at least one external SNS group, and
wherein the at least one processor is further configured to add the at least one piece of content to a group share space corresponding to the selected at least one external SNS group.

19. The mobile terminal of claim 12,
wherein the display is further configured to provide an instant group list on the execution window of the phone book application,
wherein the user input device is further configured to receive a selection of at least one instant group from the instant group list from the first user, and
wherein the transceiver is further configured to transmit the at least one piece of content to a device of a group member included in the selected at least one instant group.

20. The mobile terminal of claim 12,
wherein the user input device is further configured to receive an external device search request from the first user,
wherein the at least one processor is further configured to search for devices of second users registered in the phone book application that are located within a predefined distance from the mobile terminal in response to the external device search request,
wherein the display is further configured to provide a list of second users corresponding to the found devices, and
wherein, when at least one second user is selected from the list of second users by the first user, the transceiver is further configured to transmit the at least one piece of content to a device of the selected at least one second user.

* * * * *